Nov. 23, 1965 G. DYSON 3,219,056
NON-RETURN VALVES
Filed Dec. 27, 1962 5 Sheets-Sheet 1

INVENTOR
George Dyson
BY
Morris & Bateman
ATTORNEYS

Nov. 23, 1965

G. DYSON 3,219,056

NON-RETURN VALVES

Filed Dec. 27, 1962

INVENTOR
George Dyson

BY
Norris & Bateman
ATTORNEY

Nov. 23, 1965 G. DYSON 3,219,056
NON-RETURN VALVES
Filed Dec. 27, 1962 5 Sheets-Sheet 4

INVENTOR
George Dyson

BY
*Strauch, Nolan & Neale*
ATTORNEY

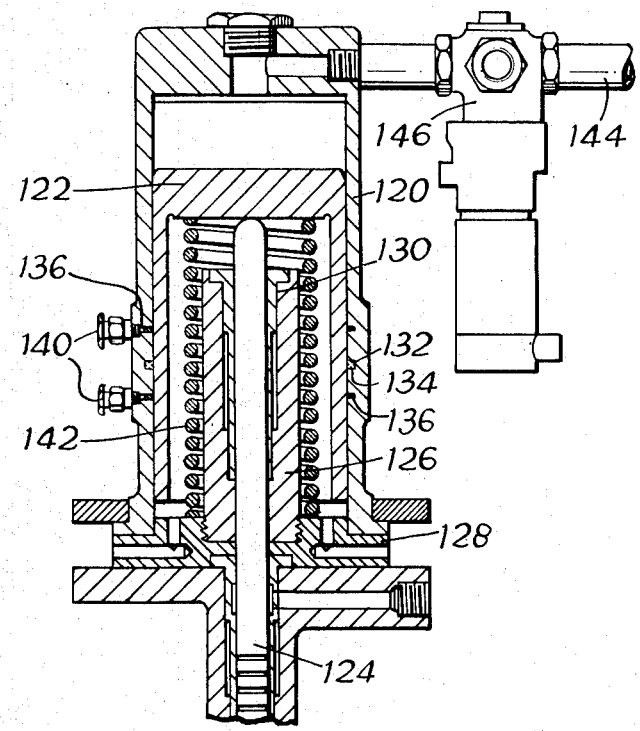

United States Patent Office 3,219,056
Patented Nov. 23, 1965

3,219,056
NON-RETURN VALVES
George Dyson, 31 Woodhouse Lane, Brighouse, England
Filed Dec. 27, 1962, Ser. No. 247,643
Claims priority, application Great Britain, Mar. 6, 1959, 7,797/59
11 Claims. (Cl. 137—514.7)

This is a continuation-in-part of application Serial No. 13,277, filed Mar. 7, 1960, and now abandoned.

This invention relates to non-return valves. Such valves are frequently used in such a manner that they are required to remain open for long periods, and may be required to close quickly after a prolonged period in an open position. Sometimes, a valve which has been open for a long period sticks in the open position, and cannot be shut quickly. This, of course, renders the valve inefficient, and in some instances it could be dangerous.

For example, it has always been necessary to fit non-return valves in bled steam lines from turbines, as the large amount of steam stored in such lines represents a potential energy which can cause overspeeding of the turbine if the steam should flow back into the turbine. A similar danger exists with compressors. For instance, if an air compressor is driven by an electric motor, and the electric power supply fails, the compressor will come to a stop, and the large amount of compressed air in the receiver and pipelines can flow back into the compressor unless prevented by a non-return valve.

Such non-return valves, however, have been known to stick in the open position, particularly if the guides have become fouled, or if the valves have been working in the open position for long periods. As improvements take place in design techniques, turbo-alternator sets, and compressors increase in size and power, and consequently become more expensive, so that the failure of these non-return valves can cause considerable damage to expensive equipment.

In recent years, attempts have been made to provide assisted closing of the valves for the purpose of overcoming any tendency for the valve to stick in the open position, and also to provide for very quick closure. In some cases only a fraction of a second is allowable for closing of the valve if damage is to be prevented, and the need for assisted closing is then obvious. The present invention is concerned with an assisted closing type non-return valve.

Previous designs of assisted-closing gear for valves have been rather elaborate and expensive, often relying on the stored energy of a large spring, held in compression by the pressure in an air cylinder, which must be exhausted before the spring can come into operation. One disadvantage of these designs is that accidental failure of the compressed air supply results in the valves being subject to the closing operation which causes excessive headloss in the pipeline and, in order to guard against this, it is often thought necessary to provide a manually-operated over-riding holding-up device so that the closing gear can be put out of action until the air supply is restored. This holding-up gear has to be particularly cumbersome when the valves are in an inaccessible position, and extension rods, and links, are necessary. Moreover, once the holding-up gear is operated, the automatic closing gear is out of action with consequent risk that the valves may be required to close during this period when the closing force is not available.

The object of this invention is to provide a non-return valve with an assisted closing gear which is efficient in operation. In particular, it is an object of the invention to provide an assisted closing gear which does not require a holding-up device as described above.

Various preferred features of the invention which are described in detail in the following particular descriptions, include the provision of a dashpot device connected to the valve member with means for nullifying the dashpot action when required, and the means for sealing working parts to prevent leakages.

Other features of the invention will appear from the following specific descriptions of valves constructed in accordance with the invention. In the accompanying drawings:

FIGURE 6 is a section through an alternative arrangement of assisted closing gear, for use where the valve is required to close against flow in the forward as well as the reverse direction.

Figure 1:
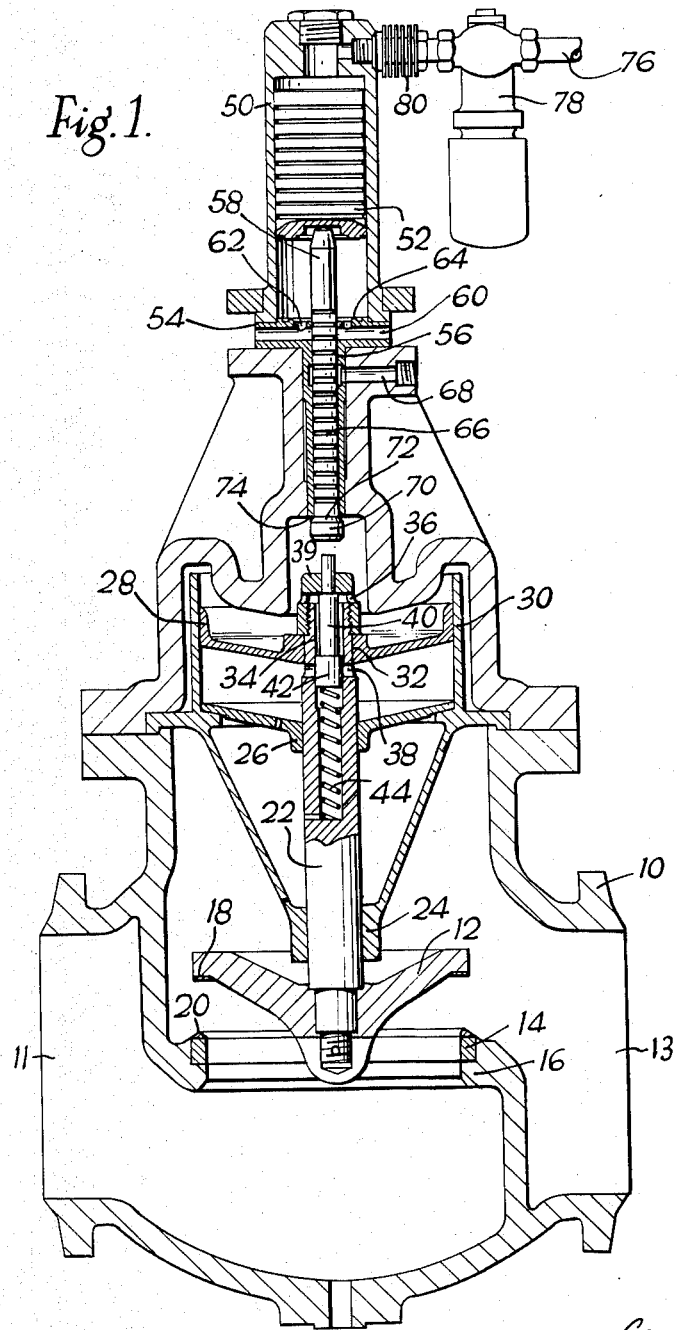
FIGURE 1 is a section through a valve showing the valve in the open position.

The valve shown in FIGURE 1 is an automatic isolating valve for use in the bled steam line of a turbine. The valve has a cast body 10 formed with inlet and outlet openings 11 and 13 respectively, and a valve member 12 which rests in the closed position, on a horizontal annular seat 14 fitted in a horizontal web 16 within the steam chamber of the valve body. An annular seat 18 formed in the valve member engages with a circular knife edge 20 formed on the seat 14 when the valve is closed. A valve spindle 22 rises vertically from the valve member and is slidable axially in bearings 24 and 26. A condensate drain hole 15 is provided in the bottom of the valve body.

At its upper end, the valve spindle 22 carries a dashpot piston 28 which works in a dashpot cylinder 30 forming part of the valve body 10. Dashpot arrangements of this type are well known to prevent violent movement of the valve member, and it will be appreciated that when the valve member rises or falls, there has to be a leakage of steam from one side of the dashpot piston to the other (which leakage normally takes place around the outside of the piston) so that there is a cushioning effect on the movement of the valve member.

In this construction, however, the dashpot piston has a central vertical bore 32 in which the upper end of the valve spindle is fixed, and the valve spindle itself is bored at its upper end, as indicated at 34 (see also FIGURE 2), there being two sets of radial ports 36 and 38, one set 36 leading through a retainer nut 39 on the top side of the piston 28 into the bore 34 of the valve spindle, and the other set 38 leading through the valve spindle on the underside of the piston 28, so that there is a passageway leading from one side of the piston to the other through the two sets of ports 36 and 38 and the bore 34 of the spindle. A stem 40 is slidable within the bore 34 of the spindle, and a head 42 on this stem normally closes the lower ports 38 as seen in FIGURE 1, the stem being held in this position by means of a compression spring 44 mounted in the spindle bore below the stem. The upper end of this stem projects above the piston 28.

Figure 2:
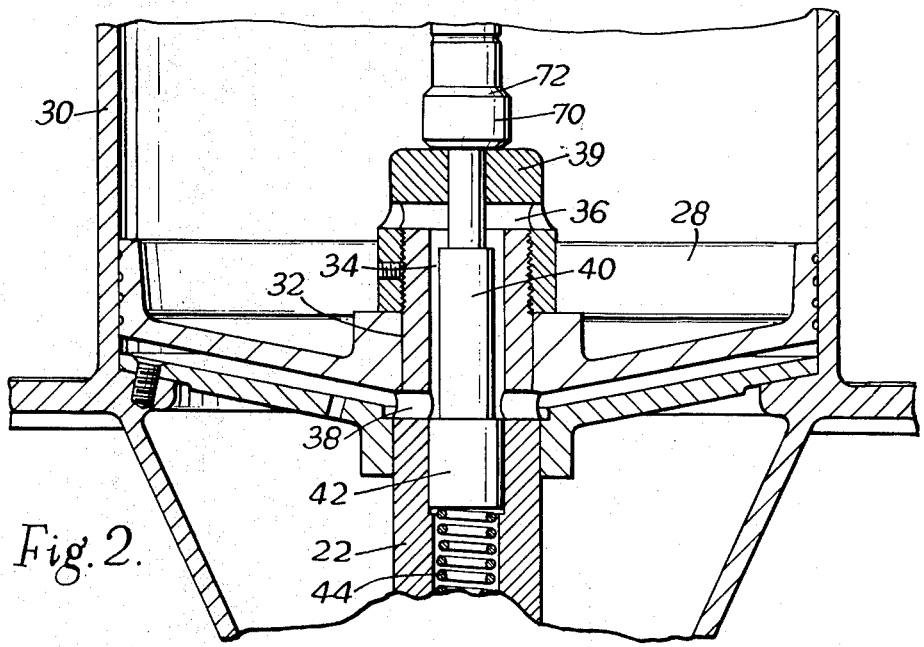
FIGURE 2 is an enlarged view of part of FIGURE 1 showing details of a dashpot valve.

A pneumatic cylinder 50 in which a piston 52 is slidable is fixed vertically on top of the valve cover (see also FIGURE 3) the lower end of the cylinder 50 being formed by a bush 54 which has a bore 56 through which a rod 58 passes, the rod 58 extending downwardly from beneath the piston into the interior of the valve, but the rod 58 is not fixed to the piston 52. A series of radial ports 60 is formed through the bush 54 from the exterior of the valve to the bore 56 through which the rod passes, and a further series of vertical ports 62 is formed in the bush from the upper surface of the bush beneath the piston into the first series of ports 60. Thus there are direct passages from the underside of the piston to atmosphere, and from the bore 56 of the bush to atmosphere. The arrangement of the rod 58 is such that when the pneumatic piston is moved downwardly (assuming the valve member 12 to be open), the rod 58 will press the stem 40 downwardly, overcoming the resistance of the compression spring 44, and moving the head 42 of the stem out of engagement with the lower ports 38 as shown in FIGURE 2. Normally, however, with the interior of the pneumatic cylinder 50 at atmospheric pressure, the compression spring 44 holds the stem 40 in its raised position, and the pressure of the steam within the valve body holds up the rod 58 in a raised position, the rod in turn holding the pneumatic piston 52 in a raised position.

The chamber within which the dashpot piston 28 works is closed on the top side side of the piston, but there is normally a leakage of steam around the piston to the top side of the piston so that the steam pressure is balanced on both sides of this piston. Whenever the valve spindle 22 is moved upwardly there is a rise in the pressure above the piston 28 due to slight compression of the steam above the piston. However, the spring 44 is designed to counterbalance any such rise in steam pressure acting on the top end of the rod 40, and to hold the rod in the position where it closes the ports 38.

The rod 58 is of such a length that when it is pressed down by pressure on the top side of the pneumatic piston 52, and the valve member 12 is fully closed, there is a small clearance between the top of the rod 58 and the part of the pneumatic piston which is engageable with the rod, so that the lower edge of this piston engages with the bottom of its cylinder, thus preventing leakage of compressed air out of the cylinder to atmosphere. To assist in forming this seal, the top side of the bush 54 is formed with a circular knife edge seat 64 on which the lower edge of the piston rests. The rod 58 is formed with a labyrinth gland 66 to minimise leakage of steam to atmosphere, and a gland leak-off passage 68 is provided in the valve cover so that any leakage does not spill over the valve cover. A head 70 is formed at the lower end of the rod 58 and has a part conical upper face 72 for engagement with an annular seat 74 in the valve cover when the rod is in the raised position (i.e. the normal working position of the valve) to prevent leakage of steam through the labyrinth gland 66.

A compressed air supply pipe 76 is connected to the upper end of the pneumatic cylinder through a solenoid operated three way control valve 78. The control valve 78 is set so that under normal operating conditions the air supply pipe 76 is sealed from the cylinder 50 and the cylinder is open to atmosphere.

An electrical control circuit includes a relay adapted to be operated by the turbine overspeed governor and is arranged to energise the solenoid when a signal is received from the governor relay. This operation of the solenoid is arranged to cause the compressed air supply pipe 76 to be connected directly to the top of the cylinder 50 through the control valve 78, and to close the connection to atmosphere. A finned adapter 80 is mounted between the control valve 78 and the cylinder 50 to dissipate heat, so as to minimise conduction of heat from the valve body to the three way control valve and its solenoid.

When the valve is operating normally, steam under pressure enters the valve through the inlet port 11, and steam pressure lifts the valve member 12 off its seat 14. The steam can then flow through the valve. Should the pressure on the inlet side of the valve fall below that on the outlet side, the steam would attempt to flow in the reverse direction, but, in doing so, it would force the valve member 12 down on to its seat, thus closing the valve and preventing return flow. The normal function of the valve is therefore that of a conventional non-return valve.

The dashpot piston 28 functions to prevent rapid movement of the valve member 12 due to small changes in the steam pressure (the head 42 on the stem 40 closing the passage through the spindle), and the pneumatic cylinder arrangement is normally inoperative. The rod 58 is raised by the pressure inside the valve body so that its head 70 is in sealing engagement with the seat 74 formed in the body to prevent escape of steam through the labyrinth gland 66, and in this position there is a gap between the head 70 and the nut 39 at the upper end of the spindle 22. As soon as a signal is received from the turbine governor, compressed air flows into the pneumatic cylinder 50 and forces the pneumatic piston 52 and the rod 58 down. The immediate effect of this is to press the stem 40 downwardly thus opening the passage through the spindle 22. Steam can then flow freely through the dashpot piston 28, and the dashpot effect is reduced or completely nullified. After this, the head 70 of the rod 58 strikes the nut 39 and gives a hammer blow to the spindle 22. This helps to release the valve member if it has become jammed in the open position. The whole assembly of valve member 12, spindle 22, and dashpot piston 28 is then forced downwardly until the valve member 12 approaches the closed position.

Just before the valve member 12 arrives at the closed position, the piston 52 will engage with the seat 64 and the piston is arrested. The valve member will then be closed by steam pressure. The action of the pneumatic assisted closing gear is to force the valve member down by the impact of the rod 58 on the spindle 22.

The steam pressure on the outlet side of the valve will then fully close the valve member 12 and hold it in the closed position until the solenoid is de-energized so that the control valve 78 again cuts off the air supply to the pneumatic cylinder 50 and opens the cylinder to atmosphere.

The air consumption is very small, as the design minimises leakages, both when the main valve is functioning normally and when the closing gear has operated. It is envisaged that, although the usual practice is to obtain the air supply from the receiver of a compressor, as described above, it would be quite feasible to use a compressed air cylinder with the usual reducing valve arrangement adjusted to give an output pressure in the region of 100 lbs. per square inch. A pressure switch would be fitted to the compressed air cylinder to give warning when the pressure was becoming exhausted.

A further advantage, due to the small air consumption, is that, when obtaining the pressure supply from a compressor, a small receiver of say one or two cubic feet capacity could be installed near the control valve, and fitted with a non-return valve on the receiver inlet. This woud ensure an ample reserve supply of compressed air to operate the closing gear should the compressed air supply fail.

A valve constructed as described above provides a more compact, reliable and less expensive arrangement than previously designed assisted closing valves and also has a quicker closing action. It will be understood that whilst the valve described above is for use in the bled steam line of a turbine, it could be readily applied to any situation in which the valve is to have rapid and positive closing to prevent return flow.

Figure 3:
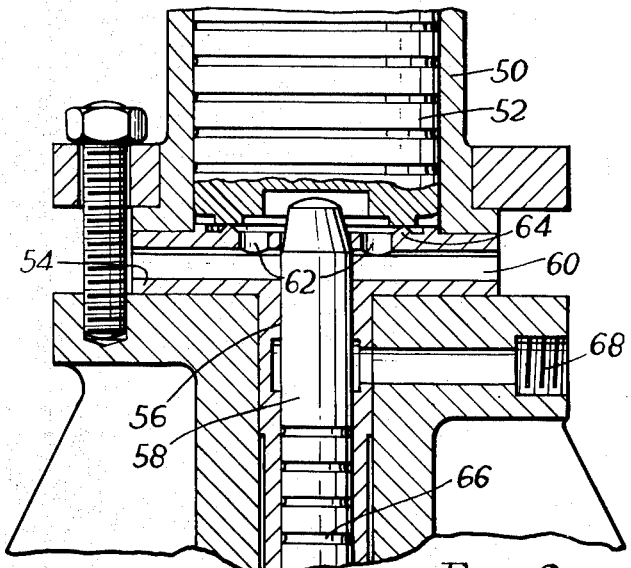
FIGURE 3 is an enlarged view of another part of FIGURE 1 showing details of a piston sealing device.
Figure 4:
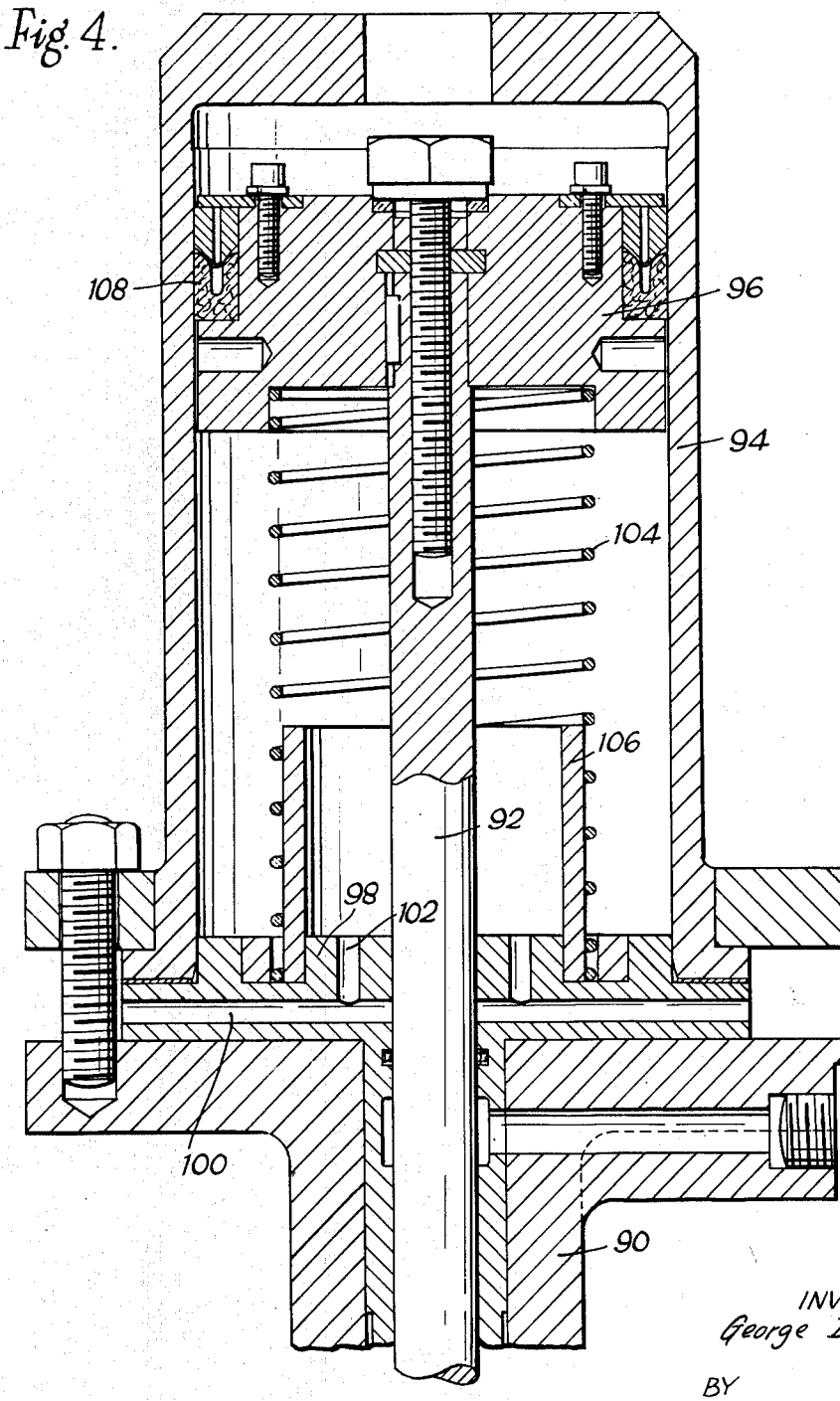
FIGURE 4 is a detail view of an alternative construction of the assisted closing gear.

If the valve is required to work at sub-atmospheric pressures, the construction shown in FIGURES 1 to 3, would not operate properly and so it is modified as shown in FIGURE 4. In FIGURE 4, 90 is the valve cover and the rod 92 is equivalent to the rod 58 in the arrangement described with reference to FIGURE 1. All the parts below the rod 92 are as described with reference to FIGURE 1 and are not shown or described here.

A pneumatic cylinder 94 is fixed on top of the valve cover 90, and a piston 96 is slidable within this cylinder, there being a solenoid operated control valve (not shown) similar to the valve 78 for regulating the supply of air under pressure to the upper end of the cylinder 94. At the base of the cylinder 94 there is a bush 98 having radial ports 100 and vertical ports 102, similar to the bush 54 in FIGURE 1.

The rod 92 may be provided with a labyrinth gland although such a gland is not shown in FIGURE 4, and it has a sealing head 70 at its lower end (not shown). In this case, however, the tendency is for air to leak into the valve, and the rod 92 cannot be held up by pressure in the valve because the pressure is sub-atmospheric. Therefore, a compression spring 104 is provided between the bush 98 and the piston 96, and the rod 92 is fixed to the piston. The compression spring 104 is only a light spring to hold up the piston and rod 92 and is easily overcome by the downward pressure when compressed air is admitted to the top end of the cylinder 94. A guide bush 106 locates the spring 104 and serves as a stop to limit the downward movement of the piston 96. In this construction, the upper part of the cylinder is sealed by a leather sealing ring 108 carried by the piston.

The operation of the assisted closing gear is exactly the same as that of the valve shown in FIGURE 1, the only difference being that in the inoperative position, the rod and piston are held up by the spring 104 instead of by steam pressure.

Figure 5:
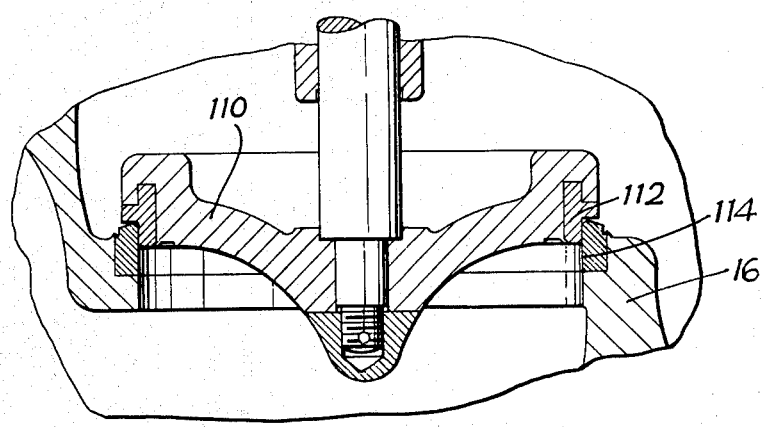
FIGURE 5 is a detail view showing a modified form of valve member.

FIGURE 5 shows an alternative form of valve member 110 which is applicable to the valve shown in FIGURE 1, and which has a skirt 112 adapted to enter the bore 114 of the web 16. The skirt 112 is deeper than the clearance between the rod 58 and the piston 52 (when the piston is at the bottom of the cylinder 50) to ensure that the valve does close properly, because by the time the piston is arrested the skirt will already be in the bore 114 and the steam flow will be practically cut off.

FIGURE 6 shows the modification which is required if the valve, in addition to operating in the ordinary way as a non-return valve, also has to be capable of closing against flow in the forward direction through the valve. The valve itself is constructed exactly as that described with reference to FIGURE 1, but the assisted closing gear is modified.

In this modification, a larger pneumatic cylinder 120 and piston 122 are provided, the cylinder 120 being fixed to the upper part of the valve cover above the dashpot piston. The larger piston is required, because when the valve has to close against forward flow of the fluid through the valve, the pressure applied to the piston 122 has to be capable of forcing the valve member 12 into the closed position against the pressure of the fluid flowing through the valve. Furthermore, in this arrangement, the rod 124, which fulfills the function of the rod 58 in the previously described valve, extends upwardly into the cylinder 120 through a guide member 126 which is fixed to a bush 128 (which is similar to the bush 54 in the previous arrangement). A gland 130 seals between the rod 124 and the guide member 126, but permits axial movement of the rod.

As clearly shown in FIGURE 6, the piston 122 is in the form of an inverted cup, and the upper end of the rod 124 is engaged by the closed upper end of the piston 122 when the latter is forced downwardly by air pressure on the top side of the piston. FIGURE 6 shows the position when the valve is fully closed, and it will be noted, that in this arrangement, the piston 122 does not engage with the bush 128 in the closed position of the valve, and that contrary to the arrangement in the valve shown in FIGURE 1, the piston remains engaged with the rod 124 even in the fully closed position. It should be mentioned, however, that there is still a gap between the lower end of the rod 124 and the upper end of the valve spindle in the open position, so that the rod imparts a hammer blow to the spindle on operation of the assisted closing gear.

Owing to the high pressure which has to be executed on the piston 122 in this arrangement, it is necessary to provide special sealing arrangements around the piston. (This is all the more necessary, because there is no seal formed by engagement of the lower end of the piston with the bush 128.) For this purpose, a special sealing ring 132 is provided in a groove 134 in the wall of the cylinder 120. This ring is made of rubber or synthetic rubber, and is substantially square in radial cross-section, with somewhat concave sides. Besides the rubber sealing ring 132, two felt washers 136 are provided in grooves in the cylinder 120, one above and one below the ring 132, and these washers are grease loaded by means of lubricators 140.

The fluid pressure within the valve acting on the rod 124 would not be sufficient to raise the piston 122 owing to the frictional effect of the ring 132 and washers 136. Therefore, a compression spring 142 is provided between the bush 128 and the closed upper end of the piston for raising the piston when the pneumatic operating means is inoperative.

A compressed air supply pipe 144 is connected to the upper end of the cylinder 120 through a solenoid operated three way valve 146. The operation of the valve when it acts as a non-return valve is the same as that described with reference to FIGURE 1. Compressed air is supplied to the cylinder 120 and the piston 122 descends rapidly causing the rod 124 to operate in the same manner as the rod 58 previously described. When the valve is to be closed against forward flow of fluid, compressed air is admitted to the cylinder 120, and the piston 122 moves down, causing the rod 124 to press the valve spindle down. This closes the valve.

I claim:

1. In a non-return valve characterised by a body having inlet and outlet ports adapted to be connected to a line, passage means through said body formed with an internal valve seat opening, a valve member adapted to seat upon and close said opening and mounted in the body for displacement by line fluid pressure to a position away from said opening, said valve member normally remaining open under said fluid pressure and being adapted to move toward closed position in response to corresponding line fluid pressure variations, fluid pressure means mounted on said body and adapted for positively assisting return of said valve member to closed position over said seat opening, said valve member having a dashpot provided with a pressure differential responsive member operably connected to said valve member for controlling movements of said valve member in response to line fluid pressure variations, and means operative when said fluid pressure means acts to move the valve member toward closed position for equalising pressure across said dashpot member to render said dashpot operatively inactive.

2. In a non-return valve characterized by a body having inlet and outlet ports adapted to be connected to a line, passage means through said body provided with an internal valve seat opening, a valve member adapted to seat upon and close said opening and mounted in said body for displacement by line fluid pressure to a position away from said opening, said valve member normally remaining open under line fluid pressure and being adapted to move toward closed position in response to corresponding line fluid pressure variations, a stem on said valve member, a fluid pressure actuator mounted on said body and having a power driven element extending toward said valve stem, means for selectively operating said actuator means from a source of fluid pressure for operatively connecting said element to the valve stem for positively returning said valve member toward closed position over said opening, dashpot means surrounding said valve stem within the body, and means operated by said power driven element before it starts to move said valve member for equalizing the pressure within said dashpot.

3. In the non-return valve defined in claim 2, said dashpot member comprising a piston on the valve stem and slidable in a body mounted cylinder, a passage through the stem between opposite sides of the piston, and a valve in the stem to normally close said passage but actuated by the power driven element to open said passage before said element starts to move the valve.

4. In a non-return valve characterized by a body having inlet and outlet ports adapted to be connected to a line, passage means through said body formed with an internal valve seat opening, a valve member adapted to seat upon and close said opening and mounted in said body for displacement by line fluid pressure to a position away from said opening, said valve member normally remaining open under line fluid pressure and being adapted to move toward closed position in response to corresponding line fluid pressure variations, a stem on said valve member, a dashpot chamber in said body, a dashpot piston on said valve stem slidable in said cylinder, a passage through the valve stem between opposite sides of the piston, a valve in the stem normally spring biased to close said passage and having an operating end projecting from said stem, a fluid pressure motor mounted on the body and having a power driven rod projecting therefrom toward said valve stem, and means for actuating said motor to displace said rod into contact with said valve end and valve stem to first open said passage and then bodily move the valve member, stem and dashpot toward valve closed position over said opening.

5. In the non-return valve defined in claim 4, said power driven rod operating in a bore that enters the dashpot chamber, said chamber containing line fluid for dashpot piston control, and coacting seal faces on said rod and the inner end of the bore for sealing against entry of line fluid into the bore when the motor is not energised.

6. In the non-return valve defined in claim 5, said rod being normally displaced to bore sealing position by fluid pressure in said dashpot chamber, said motor containing a reciprocable power element with said rod abutting an end thereof, and means for sealing the upper end of said bore when said power element reaches the end of its stroke to drive said rod.

7. In the non-return valve defined in claim 5, said rod being fixed to said power element and resiliently biased to said bore sealing position.

8. In the non-return valve defined in claim 1, said fluid pressure means including two elements normally separated when the valve is open, one of said two elements being mounted for projection under the action of said fluid pressure toward said other of said two elements so that there is impact between said two elements on operation of said fluid pressure means.

9. In the non-return valve defined in claim 2, said power driven element stopping short of said stem whereby on operation of said actuation means said power driven element has impact engagement with said stem.

10. In the non-return valve defined in claim 4, said power driven rod stopping short of said stem whereby on operation of said fluid pressure motor, said power driven rod has impact engagement with said stem.

11. In the non-return valve defined in claim 1, said fluid pressure means being controlled from a source of fluid pressure independently of said line fluid pressure.

References Cited by the Examiner
UNITED STATES PATENTS

| | | | |
|---|---|---|---|
| 901,222 | 10/1908 | Anderson | 251—33 X |
| 944,402 | 12/1909 | Anderson | 251—31 X |
| 1,623,431 | 4/1927 | McVoy | 251—62 |
| 1,745,917 | 2/1930 | Soderberg | 103—16 |
| 2,148,410 | 2/1939 | Wait | 251—76 |
| 2,744,719 | 5/1956 | McRae | 251—228 X |

M. CARY NELSON, *Primary Examiner.*

LAVERNE D. GEIGER, MARTIN P. SCHWADRON,
*Examiners.*